United States Patent Office 2,839,274
Patented June 17, 1958

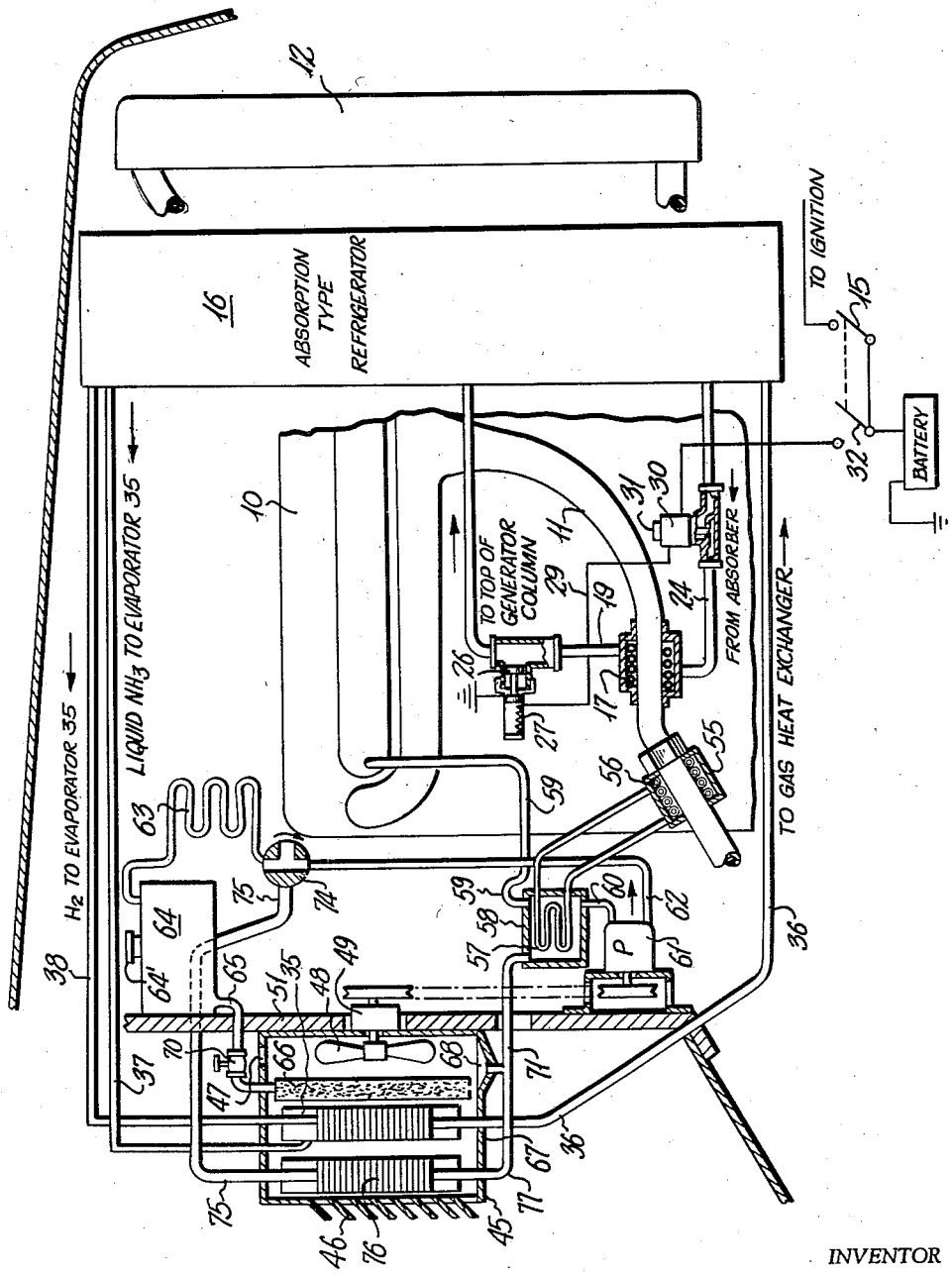

2,839,274

AIR CONDITIONING SYSTEM FOR AUTOMOBILES

Paul William Polin, Chicago, Ill., assignor to Polin Enterprises, Inc., a corporation of Illinois Application September 6, 1952, Serial No. 308,221

13 Claims. (Cl. 257—3)

This invention relates to an air conditioning system and particularly to a system for cooling and/or dehumidifying the air in an automotive vehicle. While the air conditioning system forming the subject matter of this invention may have general application, it is particularly adapted for use in connection with waste heat incident to the operation of a heat engine.

For air conditioning, it is desirable to utilize waste heat from an internal combustion engine in an automotive vehicle without, however, loading the engine to the point where substantial power generated by the engine must be diverted toward operating the air conditioning system. The power levels at which an internal combustion engine operates in automotive vehicles generally vary over substantial ranges from minimum, when idling, to a maximum when travelling at high speed or climbing a grade. This uneven operation of the engine results in uneven generation of waste heat. While attempts have been made to utilize waste heat from an internal combustion engine for operating an air conditioning system, such attempts have usually involved complicated and expensive equipment to compensate for the variable engine power output.

Additionally, air conditioning systems operating from waste heat in an internal combustion engine have hitherto operated upon a conventional refrigeration cycle. As is well known, such a refrigeration cycle involves the compression of a gaseous refrigerant, the cooling of such compressed refrigerant, the expansion of the cooled compressed refrigerant to absorb heat and the return of the warmed, expanded refrigerant back to the compressor. Refrigerating means for utilizing such a cycle may involve either a mechanical system where a conventional compressor is used or may involve a gas absorption system where a refrigerant like ammonia in water is used in connection with an inert gas like hydrogen to form a closed system free of all moving mechanical parts. The absorption type of system may assume a variety of forms but one form has been particularly successful and has been embodied in the Electrolux refrigerator manufactured by the Servel Company in the United States. A system of this type is disclosed in United States Patents Nos. 2,269,101 and 2,580,443. Inasmuch as such gas absorption refrigerators are well known and widely used, they will be referred to hereinafter as the Electrolux gas absorption system.

The efficiency of a refrigerating system, either of the mechanical or of the gas absorption type, is quite low, as is well known. Prior attempts to air condition the interior of a passenger automobile by using conventional refrigerating systems have been unsuccessful because of the low efficiency of the refrigeration system. Thus, with the waste heat available at the exhaust of an internal combustion engine, even when running at full load, the low efficiency of a refrigerating system has rendered futile the efforts to air-condition the interior of an automobile. The wide range of power developed by the engine under different conditions has further complicated the problem of air conditioning.

A further complication arising from the use of an Electrolux type of gas absorption system in an automotive vehicle relates to the stand-by characteristics of such a system. As is well known, when an Electrolux type of gas absorption system is idle, there is a tendency for the liquids and gas in the system to equalize throughout the various parts of the system. The result of such a tendency is to delay the operation of the system on a refrigerating cycle after heat has been applied. A gas absorption system used in connection with an automobile engine will, of course, be idle for periods of time. It is desirable that the gas absorption system in such a car be in an efficient stand-by condition to resume operation shortly after the engine begins to operate.

I have provided an Electrolux type of gas absorption system in conjunction with an internal combustion engine and have provided means for compensating for variations in the power level of the engine operation, said means serving to completely cut-off the circulation of liquid within the gas absorption system when the engine is dead. By virtue of the above, a gas absorption system associated with the engine, and embodying my invention, will always be ready to operate upon the starting of the engine with which the system is associated and will maintain a predetermined desired constant level of operation in spite of variations in the level of engine operation.

In addition to an absorption type refrigerating system operating from the waste heat of an internal combustion engine, I also provide means for reducing the moisture content of the air to be conditioned, said means being non-refrigerating but likewise being operated from the waste heat of an internal combustion engine for operating an automobile. It is well known that, apart from reducing the temperature of air, a reduction in the moisture content of air will have a comforting effect and thus, in a psychological sense, has an effect equivalent to reducing the temperature of the air. My invention provides means whereby the waste heat of an internal combustion engine will efficiently remove or reduce moisture from air and provide an air conditioning effect which may be independent of or may supplement the air conditioning of a conventional refrigerating system.

By providing a combination of air cooling and moisture reduction, my invention makes it possible to air condition effectively the interior of a passenger automobile with power derived solely from waste heat of an engine while driving an automobile under average conditions of load. While it is possible to provide means for reducing the moisture content only, as hereinafter disclosed, it is preferred to provide means for both cooling the air and reducing the moisture content thereof by means other than conventional refrigeration.

It is, of course, well known, that the evaporator of a refrigerating system may be operated so that it is below the dew point and condensation of the moisture content of the air will result. My invention contemplates means, independently of refrigeration, for reducing the moisture content of the air. Such means more efficiently utilizes the waste heat of an engine and hence has a tendency to endow an air conditioning system with a substantially greater operating efficiency.

In accordance with my invention, I provide a continuous gas absorption type of refrigerating system, preferably in Electrolux type of system, associated with an engine of the internal combustion type in such manner that the waste heat of the engine powers the refrigerating system. Also in accordance with my invention, I provide a system, powered by the waste heat of an automobile engine, said system providing a curtain of water-absorbing liquid through which air to be conditioned passes. The diluted liquid is heated by the engine to drive away the absorbed water. The concentrated liquid is then air cooled, the outlet of the cooling means supplying moisture absorbing liquid in concentrated form to the curtain. By the combination of the gas absorption refrigerating system and a moisture absorbing system not operating upon a refrigerating cycle, I am enabled to obtain efficient air conditioning from waste heat.

The means used for reducing the moisture content of the air, by a slight modification, may be useful for heating air to provide warmth. By operating a valve, air heating instead of air drying may be accomplished.

In order that the invention may be understood, it will now be explained in connection with the drawing wherein an exemplary system embodying the invention is illustrated. It is understood, however, that variations in the refrigerating and/or moisture removing systems may be made without departing from the spirit of the invention. Also the moisture removing system may be used alone or in combination with different refrigerating systems.

Referring therefore to the drawing, the single figure shows diagrammatically a system embodying the present invention.

An automobile or other vehicle is provided with internal combustion engine 10 having exhaust pipe 11 and radiator 12 for cooling engine 10. Inasmuch as the construction and operation of internal combustion engines, including diesel engines, are well known, a detailed description thereof will not be given. In the case of a conventional internal combustion engine, having spark ignition, an ignition switch 15 is provided for determining whether the engine is to be on or off. In the case of a diesel type of engine, a valve for fuel or other means may be provided for determining whether the engine is to be on or off. It is understood that this control in the diesel, corresponding to the ignition switch in a conventional engine, merely determines whether the engine is to operate and does not determine the operating level of the engine. The latter is determined by a throttle which may be used for controlling the intake of fuel to the engine.

As has been previously stated, a continuous gas absorption type of refrigerating system and preferably an Electrolux type of such system is used for the refrigerating part of the system embodying the present invention. Inasmuch as the construction and operation of such a continuous type of refrigerating system is well known, no detailed description thereof is deemed necessary. An absorption type refrigeration system using ammonia, water and hydrogen is provided and is shown in block outline. Such a system is disclosed in the U. S. patents referred to previously and in various handbooks. The refrigeration system generally indicated by 16 includes as a part thereof generator heater coil 17 to which heat is applied. A pipe 24 leads the concentrated solution of ammonia in water from the proper element of absorption refrigerator 16 to coil 17, and an outlet pipe 19 from heater coil 17 returns the heated solution to the refrigerator 16. This heating may be accomplished in the well known manner by heat exchange from exhaust pipe 11 of the internal combustion engine, as suggested in the above noted patents, wherein the heater coil is supplied from the absorber with the concentrated solution of ammonia in water and the heated concentrated solution is discharged from the coil into the top portion of the generator column of the refrigerator.

In pipe 19 of the absorption system, there is disposed means for responding to the pressure of the liquid in pipe 19, said means serving to vary the strength of an electric current in inverse proportion to said pressure. This means is shown simply as piston or diaphragm 26 in a suitable casing in pressure communication with the liquid in pipe 19, the piston controlling rheostat 27. Rheostat 27 has one terminal grounded and the other terminal connected by wire 29 to winding 30 of electrically-controlled valve 31 in pipe 24. The valve is of the type which is normally closed and which will open in response to current through winding 30. The resistance element of the rheostat is so arranged with respect to the control piston that with increasing pressure in pipe 19, current through winding 30 will be reduced and the valve be moved toward a closed position for throttling the flow of liquid to the generator. It is understood, of course, that the rheostat and valve are so adjusted that for full load operation of the engine, the valve will not close completely. Winding 30 has its other terminal connected through switch 32 to a battery or other source of electric power. Switch 32 is preferably tied to the ignition switch or other control of the engine so that when the engine is off, switch 32 will be open. Valve 31 will be closed when the engine is off and block the flow of liquid to generator heater coil 17. The modulating action of valve 31 upon the flow of liquid through pipe 24 is controlled by pressure conditions in pipe 19 and will tend to maintain a substantially constant level of operation of the refrigerating system in spite of variations of operating level of the engine.

Instead of electrical means connecting piston 26 and valve 31, mechanical or hydraulic control means may be used.

Cooling unit 35 is connected by pipes 36 and 37 to the gas absorption refrigeration system. It is understood that cooling unit 35 corresponds to an evaporator in a conventional Electrolux refrigerator. Instead of cooling unit 35 being formed as the usual evaporator, it is preferred to make this as a cored unit through which air may be blown.

Cooling unit 35 is disposed in cabinet 45 having louvres 46 and air inlet 47. Fan 48 driven by motor 49 blows air through cooling unit 35 and through the louvres. The fan and motor assembly may be disposed on bulkhead 51 separating the engine compartment from the body interior of the automobile.

The moisture-absorbing portion of the system operating in a non-refrigerating manner will now be described. This moisture-absorbing portion of the system comprises heating jacket 55 having coil 56 within the same, the jacket and coil being disposed around exhaust pipe 11. Coil 56 is connected by pipes to heating coil 57 disposed within closed tank 18. Heating coil 57 and coil 55 together with the connecting pipes form a closed system filled with a liquid which can be heated well above the boiling point of water. Thus for example, oil may be used. Tank 18 has moisture discharge vent 59 extending from the top thereof and has outlet pipe 60 extending from the bottom of the tank. Pipe 60 goes to the inlet of pump 61, the pump outlet being connected by pipe 62 to cooling coil 63. Coil 63 may be disposed adjacent engine radiator 12 or in some other suitable location where it will receive cool air from the outside for cooling the same. Cooling coil 63 is connected to tank 64 having filler cap 64'. Tank 64 has outlet pipe 65 extending from the bottom thereof, this pipe going to the top of filter member 66 for permitting air to contact the liquid flowing from pipe 65. Member 66 may consist of a mass of glass wool or rock wool or any other porous material which may be soaked with liquid and through which a blast of air may be blown. This porous member is carried in a suitable frame and may resemble the air filters used in hot air heating systems for homes. Member 66 is disposed within cabinet 45 having bottom 67 provided with drain 68. Cabinet 45 has air inlet 47 at the top thereof located so that air is blown by fan 48 through member 66 and through cooling unit 25 to louvres 46.

Drain 68 is connected by pipe 71 to the top of tank 58. Pump 61 is driven by any suitable means, for example by a belt from a pulley driven by motor 49.

The moisture-absorbing system described is filled with a liquid having a boiling point above that of water and which has a strong affinity for water but which may be concentrated by heating. I prefer to use diethylene glycol, although other ethylene glycols, or other suitable compounds may be used. The moisture-absorbing liquid entering tank 58 will be diluted by water absorbed from air passing through filter member 66. Heating coil 57 will raise the temperature of the moisture-absorbing liquid such as diethylene glycol to a sufficiently high point where water will be boiled off and vapor will be discharged through vent 59. Vent 59 may be connected to the intake manifold of the engine to add water vapor to the gasified or atomized fuel. As is well known, addition of water vapor has a generally desirable effect on engine performance. The connection to the intake should be restricted to prevent aspirating liquid from tank 58. Pump 61 will return the concentrated moisture-absorbing liquid to tank 64 through cooling coil 63. Coil 63 will permit the hot, concentrated moisture-absorbing liquid to cool. From tank 64 the cooled concentrated liquid will flow into filter 66. Thus a continuous removal of moisture will be provided by the cycling of the liquid in the system.

Suitable valve means 70 may be provided for controlling the circulation of moisture-absorbing liquid.

The liquid used for moisture-absorbing may be used for heating in winter. To this end, pipe 62 has two way valve 74 connected therein. Valve 74 has one outlet connected to cooling coil 63 and its other outlet connected to pipe 75 going to hot water type radiator or heater 76. The bottom of heater 76 is connected by pipe 77 to pipe 71. Heater 76 is inside of cabinet 45 and may be a conventional heater which is ordinarily connected to the engine block for its hot water. However as shown here, valve 74 may be turned in winter so that the liquid within the system will not go through the cooling coil and the moisture-absorbing filter unit. Instead the hot liquid will pass through the hot water type of radiator 76. In cold weather, the absorption refrigeration system may be disabled by keeping switch 32 open.

Although I have described a preferred embodiment of my invention, it is to be understood that modifications may be made without departing from the spirit or scope of the invention. For example, while my air conditioning system has been described in connection with an automotive vehicle, it is manifest that it may be used independently of such a vehicle or placed in other environments. Accordingly, I do not intend to be restricted to the specific details disclosed except as limited by the appended claims.

I claim:
1. A system for cooling air in a vehicle, said system comprising a continuous absorption type of refrigeration system including a generator heater coil as a part thereof, said coil having a liquid inlet and outlet,, means for supplying heat to said coil from the exhaust of an internal combustion engine for operating the refrigerating system, a valve in the liquid inlet line to the coil, means responsive to pressure in the liquid line outlet from the coil and means controlled by said pressure-responsive means for controlling said valve for modulating the flow of liquid to the coil as the liquid pressure in the outlet of the coil varies to compensate for variations in operating level of the internal combustion engine, the valve throttling the liquid intake to the heater coil increasingly with rise in said outlet pressure due to rise in the level of engine operation.

2. In combination, a continuous absorption type refrigation system including a generator heater coil, said coil having a liquid line inlet and a liquid line outlet, said system including a cooling unit disposed in the passenger compartment of an automotive vehicle, said automotive vehicle having a heat engine as the prime mover, means for blowing air past the cooling unit, a normally closed valve in the inlet supply to the coil, pressure- responsive means in the liquid line outlet from the coil, means interconnecting said valve and pressure responsive means for reducing the flow of liquid to the coil with increase in liquid pressure in the outlet of the coil, means for supplying heat from said engine to said coil for operating the same and means for disabling said pressure-responsive valve control when said engine is not operating whereby said valve assumes its normally closed position.

3. The system according to claim 2 wherein said heat engine has electric ignition with an ignition switch for stopping the engine and wherein said valve has electromagnetic means for operating said valve, said electromagnetic means including an energizing circuit and wherein said ignition switch for the engine includes means for opening said valve energizing circuit when said ignition switch is open.

4. For use in an automotive vehicle having a heat engine for driving the same and having a passenger compartment, the combination of a continuous absorption type refrigerating system having a cooling unit in the passenger compartment, means for operating said refrigerating system from the waste heat of said engine, a liquid circulating system having an organic liquid therein which has a strong affinity for water and has a boiling point substantially higher than water so that said liquid may be concentrated by heating the same, said system including a porous air permeable finely reticulated filter member having a liquid inlet and liquid outlet and adapted to have said water absorbing liquid passing through said member in contact with a great number of tortuous surfaces of the filter, said filter forming a great number of tortuous paths through which air to be dehumidified may pass in intimate contact with the hygroscopic organic liquid wetting said surfaces, said member being disposed in said passenger compartment, liquid heating means and atmosphere cooled cooling means in said liquid system connected serially between the outlet and inlet of said air permeable member, means for circulating said liquid in said system, said liquid heating means having a vent for discharging vaporized water means for introducing air into said passenger compartment by passing said air through said filter and also in heat exchange contact with said cooling unit so as to reduce the moisture content thereof and to cool the same and means for heating said liquid heating means from the waste heat of said engine whereby waste heat of said engine both removes moisture from the air in said passenger compartment and also reduces the temperature thereof to provide an air-conditioning system having an overall efficiency substantially higher than is possible with a refrigerating system alone.

5. The system according to claim 4 wherein said absorption refrigerating system includes as a part thereof a generator heater coil having a liquid inlet and liquid outlet and means responsive to the pressure in the liquid outlet of said coil for reducing the flow of liquid in said coil inlet.

6. The system according to claim 5 wherein said generator heater coil inlet has a normally closed valve for controlling the flow of liquid and wherein means are provided for closing said valve when said engine is not operating.

7. The system according to claim 4 wherein said engine has a control element for starting and stopping the engine, an electromagnetic valve, including a winding, having a normally closed position disposed in the generator inlet and means controlled by said engine control element for opening the circuit for the valve winding when said element is operated to stop the engine.

8. A combined air heating and air drying system for use alternately in winter or summer, said system comprising a heating unit having an inlet and outlet, means for heating said unit from the waste heat of an internal combustion engine, water vapor discharge vent in said unit, a cooling coil and air permeable unit connected serially between the unit outlet and inlet, said air permeable unit having air permeable liquid absorbing means, a liquid in said system having a strong affinity for water and having a boiling point above that of water, a hot water type radiator through which liquid may flow connected across the heating unit inlet and outlet, a valve for closing off liquid to either the radiator or both the cooling coil and air permeable unit, means for circulating said liquid in said system and means for blowing air through said air permeable unit and radiator.

9. The system according to claim 8 wherein said system is disposed in an automotive vehicle with the air permeable unit and radiator both in the passenger compartment.

10. The system according to claim 9 wherein said liquid is diethylene glycol.

11. The system according to claim 8 in combination with a continuous absorption refrigerating system, said refrigerating system including a generator and means for heating said generator from waste heat of said engine whereby a complete heating and air conditioning system is efficiently powered from waste heat of an internal combustion engine, said refrigerating system including a heat exchanger for cooling air, said heat exchanger being disposed between the air permeable unit and radiator.

12. In an automobile vehicle having an internal combustion engine as the prime mover and having a passenger compartment, said engine having a fuel mixture intake, the combination of a filter chamber containing an air permeable mass contacted by a liquid having a strong affinity for water and having a boiling point higher than that of water, a liquid circulating system for said liquid included in said filter chamber comprising liquid circulating means, liquid heating means and liquid cooling means serially connected between the outlet and inlet of said filter chamber, said liquid heating means having a water vapor discharge vent to discharge the water evaporated from said liquid prior to cooling said liquid and admitting it into the filter chamber, a duct connecting said vent to said fuel mixture intake, means for heating said liquid heating means with waste heat from said automotive engine, and means for passing air through said filter chamber to reduce the moisture content thereof before admission of the air into the passenger compartment.

13. In an automotive vehicle having a heat engine as the prime mover and having a passenger compartment, the combination of a filter chamber in said passenger compartment, said filter chamber containing an air permeable finely reticulated mass forming a great number of tortuous surfaces bounding a great number of tortuous paths, said surfaces being contacted by an organic liquid having a strong affinity for water and having a boiling point higher than that of water, said filter chamber being included in a liquid circulating system having means for circulating said liquid, heating means and cooling means for said circulating liquid serially disposed between the outlet and inlet of said filter chamber, said liquid cooling means comprising a cooling coil having an extended surface exposed to the cooling action of the atmosphere, said liquid heating means having a water vapor discharge vent, means for heating said liquid heating means with waste heat from said engine and means for forcing air through said filter mass into said passenger compartment whereby, during engine operation, air passing into the passenger compartment through said filter chamber in contact with films of said organic liquid formed on the tortuous surfaces of said finely reticulated mass will have its moisture content reduced.

References Cited in the file of this patent

UNITED STATES PATENTS

| | | |
|---|---|---|
| 1,673,931 | Backstrom | June 19, 1928 |
| 1,960,040 | Widell | May 22, 1934 |
| 1,985,636 | Foss | Dec. 25, 1934 |
| 2,042,355 | Munters | May 26, 1935 |
| 2,062,771 | Stead | Dec. 1, 1936 |
| 2,066,660 | Thomas | Jan. 5, 1937 |
| 2,134,188 | Haywood | Oct. 25, 1938 |
| 2,147,248 | Fleisher | Feb. 14, 1939 |
| 2,229,163 | Anderson | Jan. 21, 1941 |
| 2,258,730 | Bichowsky | Oct. 14, 1941 |
| 2,269,101 | Grubb | Jan. 6, 1942 |
| 2,284,914 | Miller | June 2, 1942 |
| 2,324,193 | Brunel | July 13, 1943 |
| 2,336,674 | Crawford | Dec. 14, 1943 |
| 2,355,828 | Taylor | Aug. 15, 1944 |
| 2,592,712 | Knoy | Apr. 15, 1952 |